F. H. BLASS.
STEERING GEAR.
APPLICATION FILED JULY 24, 1914.
1,185,169.
Patented May 30, 1916.
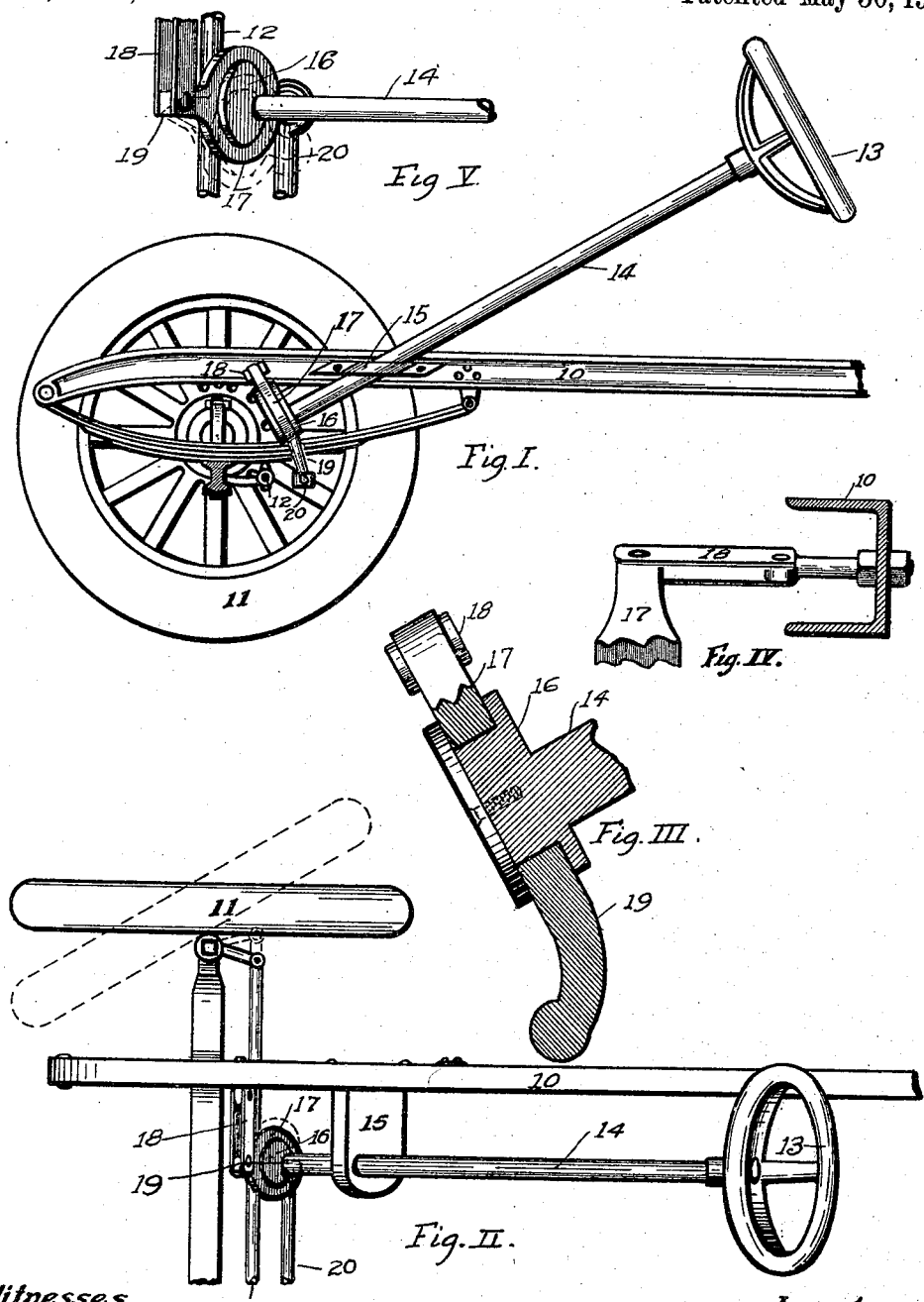

UNITED STATES PATENT OFFICE.

FRED H. BLASS, OF ODEBOLT, IOWA.

STEERING-GEAR.

1,185,169.

Specification of Letters Patent.   Patented May 30, 1916.

Application filed July 24, 1914.   Serial No. 852,788.

*To all whom it may concern:*

Be it known that I, FRED H. BLASS, a citizen of the United States, residing in Odebolt, county of Sac, and State of Iowa, have invented a new and useful Improvement in Steering-Gears, of which the following is a specification.

My invention relates to an improved steering gear adapted for use in all classes of self propelled vehicles, and it has for its object to produce a simple, strong and durable, device in which a slight movement of the steering wheel will cause a considerable movement of the guide wheels of the car.

The invention consists of certain details of construction hereinafter set forth, pointed out in my claims, and illustrated in the accompanying drawings, in which—

Figure I shows a portion of an automobile fitted out with my device; Fig. II shows a plan view of the same, the dotted lines indicating the positions of the parts when the steering wheel has been rotated to turn the front wheels of the car to an angle; and Figs. III, IV and V, show detail views of their respective parts.

Referring to the accompanying drawings the reference numeral 10 is used to indicate the frame of a car, the numeral 11 one of the front wheels thereof and the numeral 12 the steering bar, mounted to the stub axles of the front wheels in the usual manner, as shown.

The numeral 13 indicates the steering wheel secured on the post 14 and anchored, for rotation, in the bearing 15, the lower end of said post being rigidly secured to an eccentric wheel 16, rotatably mounted in the eccentric bearing 17 which is movably secured, at its lower end, to a metal strap 18, the other end of said strap being pivotally secured to the frame of the car. Also rigidly secured to the eccentric bearing is a knuckle arm 19, its outer end rotatably mounted to a bar 20 which is parallel to, and rotatably secured to, the steering bar 12.

In practical operation the driver of the car rotates the steering gear thereby transmitting rotary motion to the post 14, which in turn rotates the eccentric wheel 16 within its bearing, thus moving the bearing, pivotally, from its mounting with the strap 18, the knuckle arm 19 moving the bar 20 laterally, which in turn moves the steering bar 12 and the wheels 11.

Having thus described my invention what I claim and desire to secure by Letters Patent of the United States is:

1. In combination with the steering post, steering bar and frame of a vehicle, an eccentric ring-like bearing, a link pivotally secured to the frame and pivotally secured to said bearing, said link being disposed tangential to the bearing, an eccentric rigidly secured to the lower end of the steering post and rotatably mounted in said bearing and supporting the latter, a knuckle rigidly secured to the bearing, and a bar pivotally connected at one end to the knuckle and rigidly connected at its other end to said steering bar, said link acting to provide a point about which the bearing may bodily oscillate.

2. In combination with a steering post, steering bar and frame of a vehicle, an eccentric rigidly secured to the lower end of the steering post, an eccentric bearing movably connected to and supported by the eccentric, a connection between the bearing and steering bar, and means interposed between the frame and bearing and pivotally connected to each for mounting the bearing so that the latter may bodily oscillate.

FRED H. BLASS.

Witnesses:
 LIZZIE HENNING,
 ZELL G. ROE.

Copies of this patent may be obtained for five cents each, by addressing the "Commissioner of Patents, Washington, D. C."